United States Patent
Bartolomie et al.

(10) Patent No.: US 9,223,971 B1
(45) Date of Patent: Dec. 29, 2015

(54) USER REPORTING AND AUTOMATIC THREAT PROCESSING OF SUSPICIOUS EMAIL

(71) Applicant: Exelis Inc., McLean, VA (US)

(72) Inventors: Joshua G. Bartolomie, Deerfield, NY (US); Vince Thomas, Brambleton, VA (US); Kevin Stilwell, Vernon, NY (US); Derek Larson, Rome, NY (US); Tracy Nitti, Utica, NY (US)

(73) Assignee: Exelis Inc., Herndon, VA (US)

( * ) Notice: Subject to any disclaimer, the term of this patent is extended or adjusted under 35 U.S.C. 154(b) by 0 days.

(21) Appl. No.: 14/166,210

(22) Filed: Jan. 28, 2014

(51) Int. Cl.
*G06F 21/56* (2013.01)

(52) U.S. Cl.
CPC ..................... *G06F 21/56* (2013.01)

(58) Field of Classification Search
CPC ............ H01L 63/1441; H01L 63/1416; H01L 63/145; H01L 63/14; H01L 63/0227; H01L 41/22; H01L 51/24; H01L 12/585
USPC ...................... 726/23, 25; 707/767
See application file for complete search history.

(56) References Cited

U.S. PATENT DOCUMENTS

| | | | |
|---|---|---|---|
| 7,127,680 B2 | 10/2006 | Pang | |
| 7,899,866 B1* | 3/2011 | Buckingham et al. | 709/206 |
| 8,219,627 B2 | 7/2012 | Pang | |
| 8,776,180 B2* | 7/2014 | Kumar et al. | 726/3 |
| 2003/0188196 A1* | 10/2003 | Choi | 713/201 |
| 2004/0073617 A1* | 4/2004 | Milliken et al. | 709/206 |
| 2005/0081059 A1 | 4/2005 | Bandini et al. | |
| 2005/0216770 A1* | 9/2005 | Rowett et al. | 713/201 |
| 2006/0075504 A1* | 4/2006 | Liu | 726/25 |
| 2008/0086345 A1* | 4/2008 | Wilson et al. | 705/7 |
| 2011/0295959 A1* | 12/2011 | Martin et al. | 709/206 |
| 2012/0066498 A1* | 3/2012 | Engert | 713/170 |
| 2012/0096553 A1 | 4/2012 | Srivastava et al. | |
| 2012/0150967 A1 | 6/2012 | Cai et al. | |
| 2012/0250586 A1* | 10/2012 | Ahmavaara et al. | 370/259 |
| 2014/0032589 A1* | 1/2014 | Styler et al. | 707/767 |

OTHER PUBLICATIONS

Jyothi, "Approaches and Scenarios to Combat Cyber Crime", Dec. 2014, IJCSET, p. 376-383.*
International Search Report and Written Opinion in counterpart International Application No. PCT/US2015/013311, mailed May 18, 2015.

* cited by examiner

*Primary Examiner* — Jason Lee
*Assistant Examiner* — Gregory Lane
(74) *Attorney, Agent, or Firm* — Edell, Shapiro & Finnan LLC

(57) ABSTRACT

A computer device displays email messages received in connection with a user account and a user selectable icon to report suspicious email. The computer device receives user selections of the icon and an associated suspicious email message among the received email messages. Responsive to the selection, the computer device automatically collects information from the host, the user account, and the email message, determines an initial threat priority for the email message based on the collected information, generates threat indicators based at least on each file attachment of the email message, if any, determines malware, if any, in the email message based on the threat indicators, and creates an event ticket for the suspicious email message having fields populated based on the collected information, the initial threat priority, the threat indicators, and the determined malware.

26 Claims, 13 Drawing Sheets

| EVENT TICKET: Re: Document1 - Message (Plain Text) | □ □ ⊠ |

| File | Message | Insert | Options | Format Text | Review |

| New | Delete | Respond | Move | Tags | Find | Report Suspicious Email Exelis ISRM |

From: ☐ SVC-CIRC-SPAM  Sent:
To: ☐ SVC_CIRC_RT
Cc:
Subject: SPAM SUBMITTED - EXELIS SUBMISSION: Re: Document1         1104

☐ NoName-02524176-5bfc-4a40-8577-9de3ca6b39ad-suspicious_email_mailitem.zip [55 KB]
☐ NoName-1b5299ec-8b2a-4370-9b31-6bd8242000af-suspicious_email_attachments.zip [45 KB]
☐ NoName-a6f1fbb5-12e9-4e9a-9cc1-f1c40a0e3ba4-suspicious_email_fulltext.txt [7 KB]

Subject: EXELIS SPAM SUBMISSION: Re: Document1                                1102
To SPAM.Reporting
From [internal employee's email address]
Category HIGH
Regex Matched\battached\b
Body of Spam Notification Email User Alias: [internal employee]                   1106
Hostname: [employee's computer name]
IP Address: [employee's IP address]
Original Sender: [sender of suspicious email]
Attachment Count: 1
Attachments:
management.pdf
Hyperlink Count: 0
Hyperlinks:

Attachments Found 1
Management.pdf|3cb60cd159a12a9200fa36cff8e90905
  -Email Threat Determination: Auto Resolved ⎫
  - Threat Agent: Generic                     ⎪
  - Targeted Attack: No                       ⎬ 1304
  -Status: Resolved                           ⎪
  -Final Threat Priority: Low                 ⎭

FIG.13

1300
EVENT TICKET

USER REPORTING AND AUTOMATIC THREAT PROCESSING OF SUSPICIOUS EMAIL

TECHNICAL FIELD

The present disclosure relates to user reporting and automated threat processing of suspicious email messages.

BACKGROUND

Employees in a business enterprise access email services through networked personal computer devices, such as laptop computers, smart phones, and the like, while Information Technology (IT) personnel manage the email services through networked enterprise servers. The employees may receive suspicious email messages that may or may not contain malware from unsolicited, unrecognized sources. Typically, the employees do not have a convenient, standardized way to report the suspicious email message to the IT personnel, so that the IT personnel can investigate the report. Assuming that the employees are able to report the email messages, the IT personnel often pursue a manually intensive and somewhat random investigatory process to determine whether the email messages are either innocuous or pose a serious threat. In large business enterprises, this manually intensive and random approach to handling suspicious email messages is burdensome on both the employees and IT personnel and also leads to inconsistent report resolutions.

BRIEF DESCRIPTION OF THE DRAWINGS

FIG. 13 is a view of an example suspicious email event ticket/incident report generated in the method depicted in the flowchart of FIG. 3.

DESCRIPTION OF EXAMPLE EMBODIMENTS

Overview

Techniques provided herein enable an email account user to report suspicious email messages in a convenient manner and then automatically process the reported (suspicious) email to resolution. The techniques include displaying, for an email client configured to execute on a host computer device, one or more email messages received in connection with a user account and a user selectable icon to report suspicious email. The techniques further include receiving user selections of the icon and an associated suspicious email message among the received one or more email messages, and responsive to the selection, automatically: collecting information from the host, the user account, and the email message; determining an initial threat priority for the email message based on the collected information; generating threat indicators based at least on each file attachment of the email message, if any; determining malware, if any, in the email message based on the threat indicators and the collected information; and creating an event ticket for the suspicious email message having fields populated based on the collected information, the initial threat priority, and the determined malware.

Example Embodiments

Figure 1:
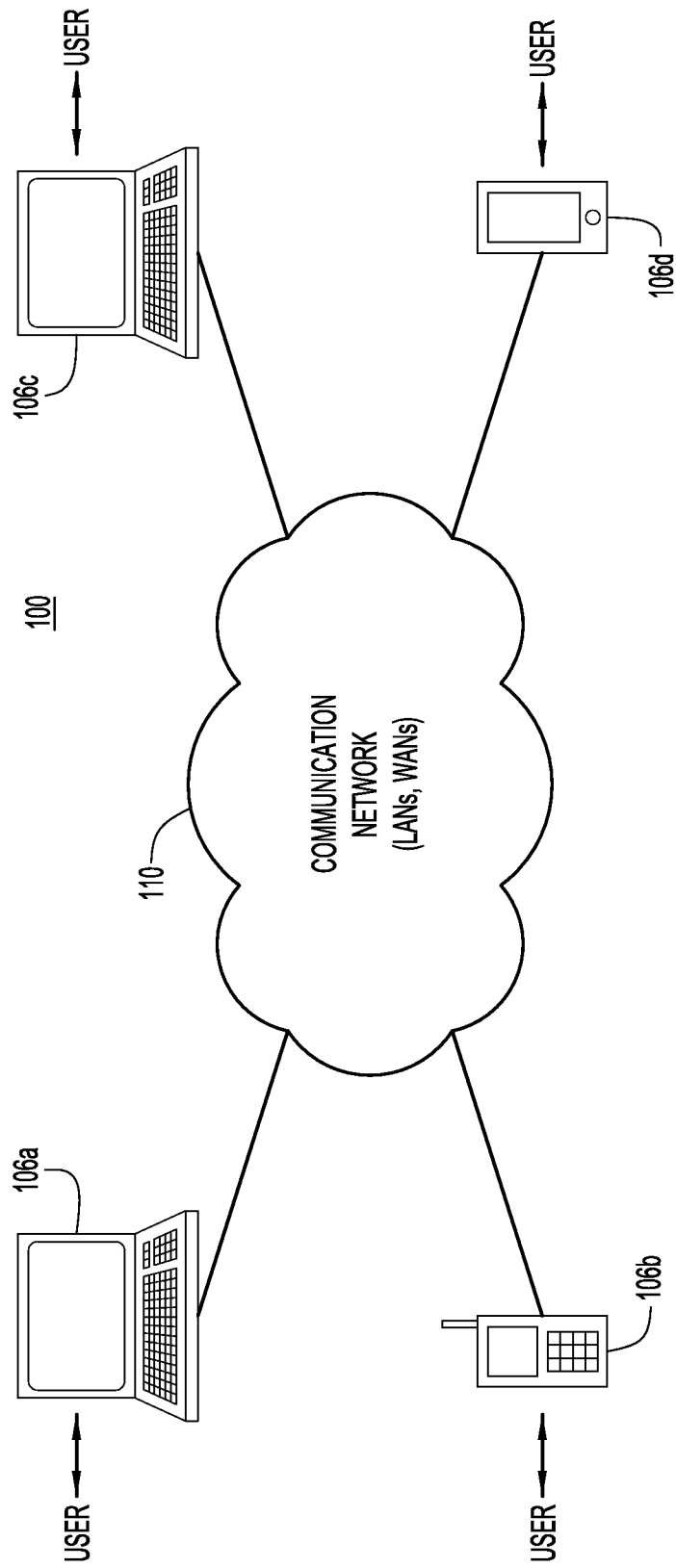
FIG. 1 is a block diagram of an example computer network in which techniques described herein may be implemented.

With reference to FIG. 1, a block diagram of an example computer network 100 is shown in which techniques provided herein may be implemented. Computer network 100 includes a plurality of computer devices 106a, 106b, 106c, and 106d each configured to interact with a corresponding user and communicate, i.e., send and receive data, over a communication network 110. Networked computer system 100 typically includes a larger number of computer devices than the four representative devices 106 depicted in FIG. 1. Computer devices 106 may be wireless communication devices and may include, e.g., personal computers (PCs), laptop PCs, tablets, mobile/smart phones, and computer servers that serve as network services management devices, data repositories, and the like. Communication network 110 can include one or more wide area networks (WANs), such as the Internet, and one or more local area networks (LANs), which may include wireless LANs (WLANs) to connect with computer devices 106. Computer devices 106 may be part of an enterprise network configured to serve a business enterprise, such as a corporation, government agency, and the like. An enterprise network includes (i) many networked personal computer devices (e.g., laptops and smart phones) each to provide computer services to a corresponding employee/user, and (ii) one or more networked servers to provide centralized management of such services. Alternatively, computer devices 106 may be stand-alone devices that are not part of an enterprise network.

Whether computer devices 106 are stand-alone or part of an enterprise network, the computer devices each host and/or have access to an email application (also referred to herein as an "email client") to provide a user with email services. Examples include Microsoft Outlook®, GMAIL®, and mobile applications such as mail.com for the Android operating system, and so on. As is known, the email client enables email messages to be created, sent to communication network 110, received from the communication network, and displayed via a Graphical User Interface (GUI) of the email client. Received (and displayed) email messages may include email messages from known/trusted senders and associated email addresses, as well as unsolicited email messages from unknown senders and associated email addresses.

A user may suspect that a displayed, unsolicited email message is malicious in nature. Such a "suspicious" email may include malware, e.g., viruses, spyware, and the like, or may be part of a phishing attack. A phishing attack is a form of a social engineering attack that uses spoofed email messages and websites to gain unauthorized access to personal and sensitive information about the user, for example. The attacker masquerades as a familiar organization in contacting the targeted victim (user). The user is invited to visit an embedded link (e.g., Uniform Resource Locators (URLs)/hyperlinks) in the email message, download or open a file attachment of the email message, or simply respond to the sender (email address) of the suspicious email.

If a user suspects that a received, displayed email message may be malicious, techniques provided herein enable the user to report the suspected email as a "suspicious email" in a convenient and consistent manner. Once the suspicious email has been reported, the techniques automatically perform suspicious email threat processing, including analysis and event/incident reporting, based on the user reported suspicious email, as will be described more fully below. The automated threat processing results in consistent, standardized threat resolution.

Figure 2:
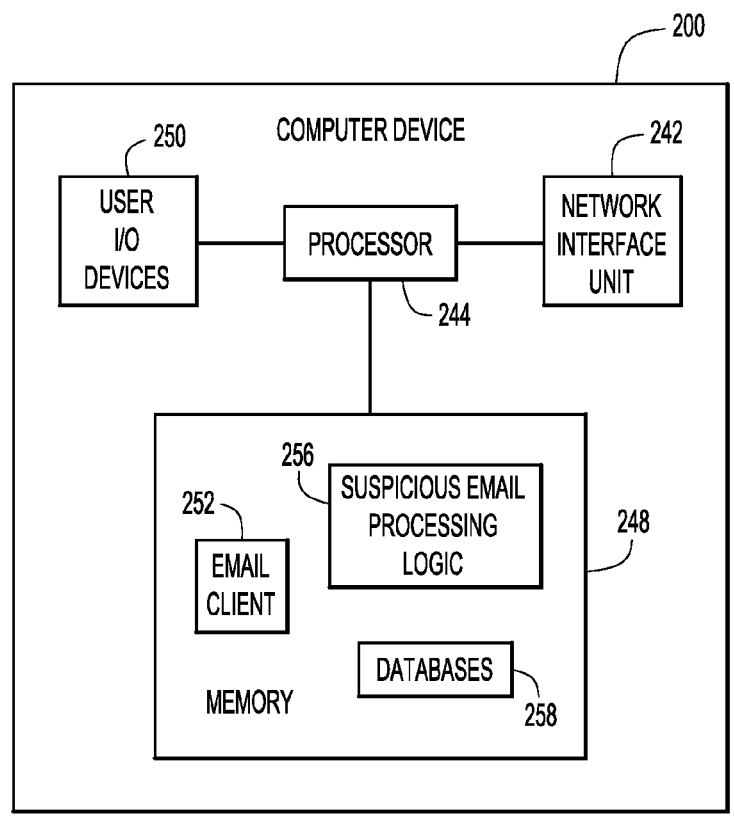
FIG. 2 is a block diagram of an example computer device from FIG. 1.

With reference to FIG. 2, there is an example block diagram of computer device 200 corresponding to any of computer devices 106 in FIG. 1 and configured to perform operations described herein. There are numerous possible configurations for computer device 200 and FIG. 2 is meant to be an example. Computer device 200 includes a network interface (I/F) unit 242, a processor 244, memory 248, and user Input/Output (I/O) devices 250 used in association with the one or more GUIs to enable a user to interface with the computer device. The network interface (I/F) unit 242 is, for example, an Ethernet card device that allows computer device 200 to communicate over a network, e.g., a wired (Ethernet) network. Network I/F unit 242 may also include wireless connection capability. Network I/F unit 242 may send and receive email messages over communication network 110. The processor 244 is a microcontroller or microprocessor, for example, configured to execute software instructions stored in the memory 248. I/O devices 250 include devices to accept input from and present information to a user. I/O devices 250 may include a display/monitor (which may be a touch sensitive display for accepting user input), a mouse, a keyboard, a printer, and the like.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software comprising computer executable instructions and when the software is executed (by the processor 244) it is operable to perform the operations described herein. For example, the memory 248 stores or is encoded with instructions for (i) an Email Client 252 to perform generalized email operations, such as create, send, receive, and display email messages in an known manner, and (ii) Suspicious Email Processing (SEP) logic 256 to enable a user to report a suspicious email message and perform automated threat processing of the reported (suspicious) email message according to techniques provided herein. Email Client 252 may be any commercially available email program and may be modified as necessary to support the operations described herein. In addition, the memory 248 includes one or more databases 258 to store email user lists, malware lists, and other data used by SEP logic 256. The memory also store GUI logic to support user interactions described herein.

In the embodiment depicted in FIG. 2, SEP logic 256 is hosted in its entirety on a given computer device (e.g., one of computer devices 106). In another embodiment (referred to as a "distributed embodiment"), SEP logic 256 may be divided into multiple logic modules each hosted on a separate corresponding computer device. The distributed embodiment is advantageous in certain network environments, such as the enterprise network. The distributed embodiment will be described below in connection with FIG. 7.

Figure 3:
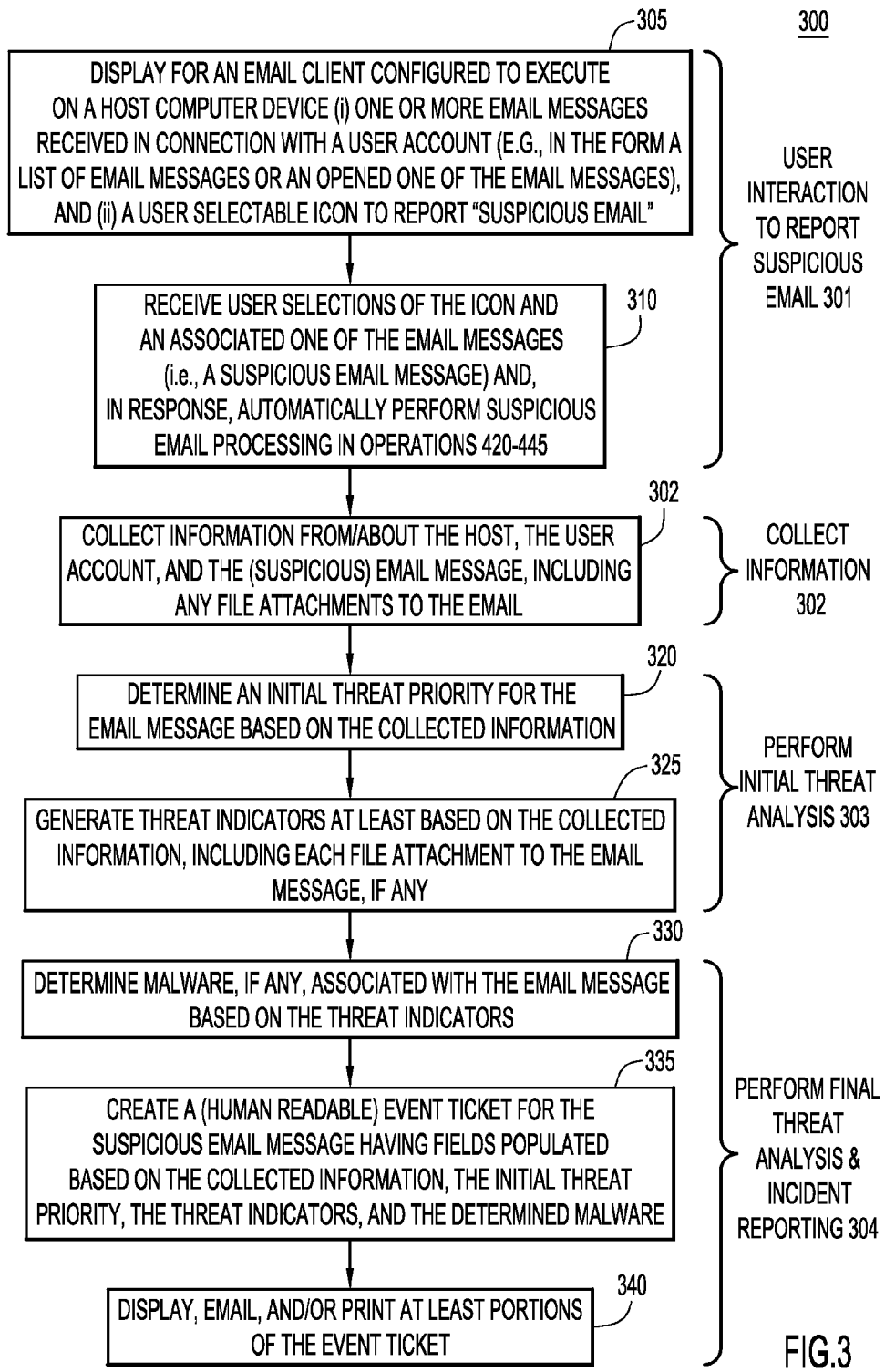
FIG. 3 is a flowchart of an example high-level method of user reporting and resulting automatic processing of a suspicious email message.

With reference to FIG. 3, there is depicted a flowchart of an example high-level method 400 of user reporting and resulting automatic processing of a suspicious email message, performed by Suspicious Email Processing logic 256 in connection with Email Client 254. All of the operations of method 300 may be performed in a given one of computer devices 106. Alternatively, the operations may be divided among multiple ones of the computer devices 106 in accordance with the distributed embodiment (mentioned above and described further below).

For the purposes of method 300, it is assumed that a host computer device, e.g., any of computer devices 106, receives email messages in connection with a user account associated with a user name (e.g., "John Doe") and a corresponding email address. That is, the received email messages are addressed to the email address associated with user account.

At a high-level, method 300 includes the following successive processing stages:

a. a first processing stage 301 of user interaction through which a user may report a suspicious email message;
b. a second processing stage 302 that automatically collects relevant information about the reported (suspicious) email;
c. a third processing stage 303 that automatically performs initial threat analysis on the reported email based on the collected information; and
d. a fourth processing stage 304 that automatically performs final threat analysis and incident reporting for the reported email based on results of the second and third stages of processing.

First processing stage 301 requires receipt of a selection resulting from user interaction, while subsequent processing stages 302-304 are performed automatically. Processing stages 301-303 each generate corresponding processing results and feed those results to the next processing stage, while fourth processing stage 304 generates a suspicious email incident report, as described below.

First processing stage 301 includes operations 305 and 310.

Figure 4:
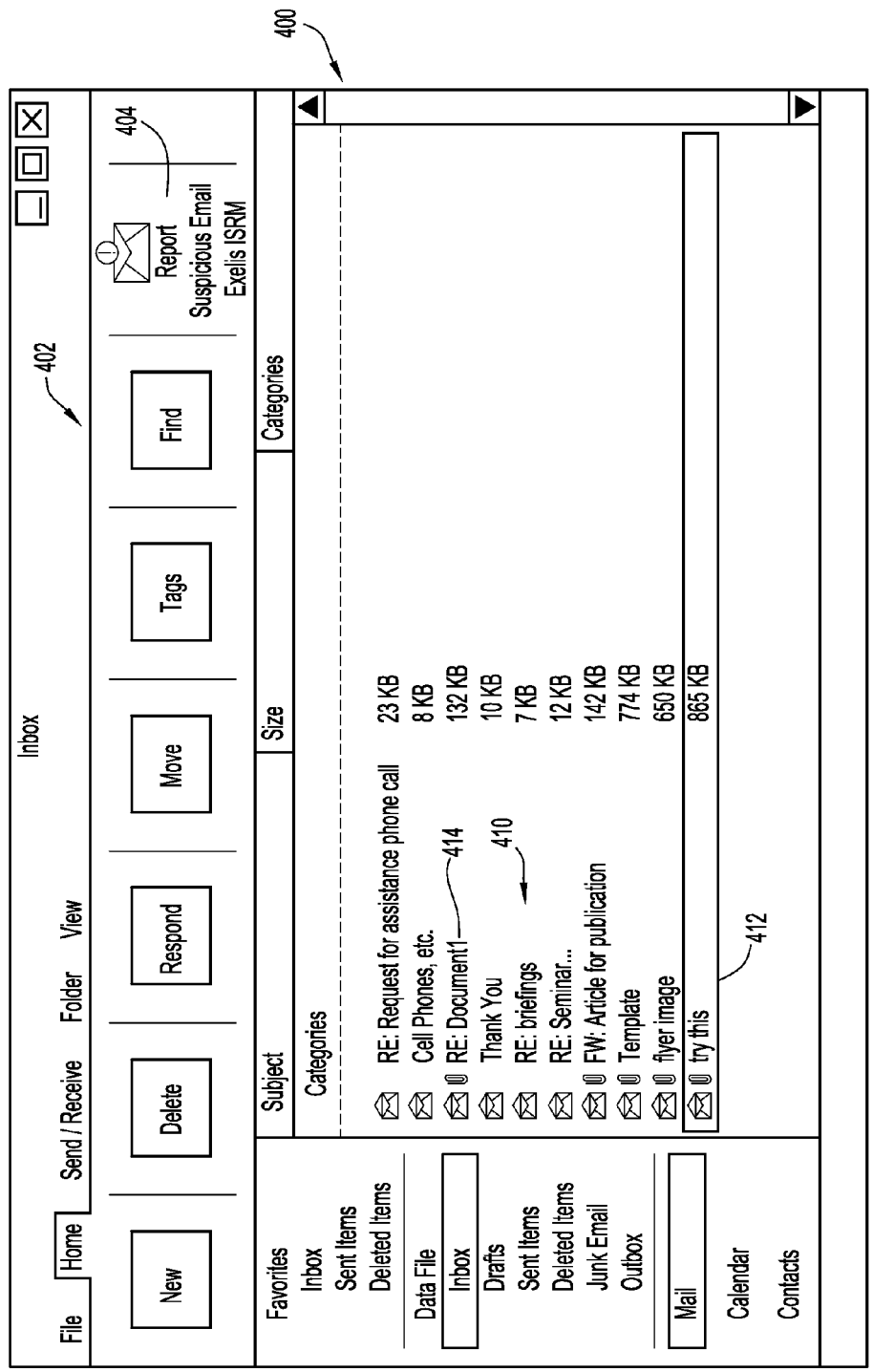
FIGS. 4, 5, and 6 are example Graphical User Interface (GUI) views displayed to a user at various points in the method depicted in the flowchart of FIG. 3.
Figure 5:
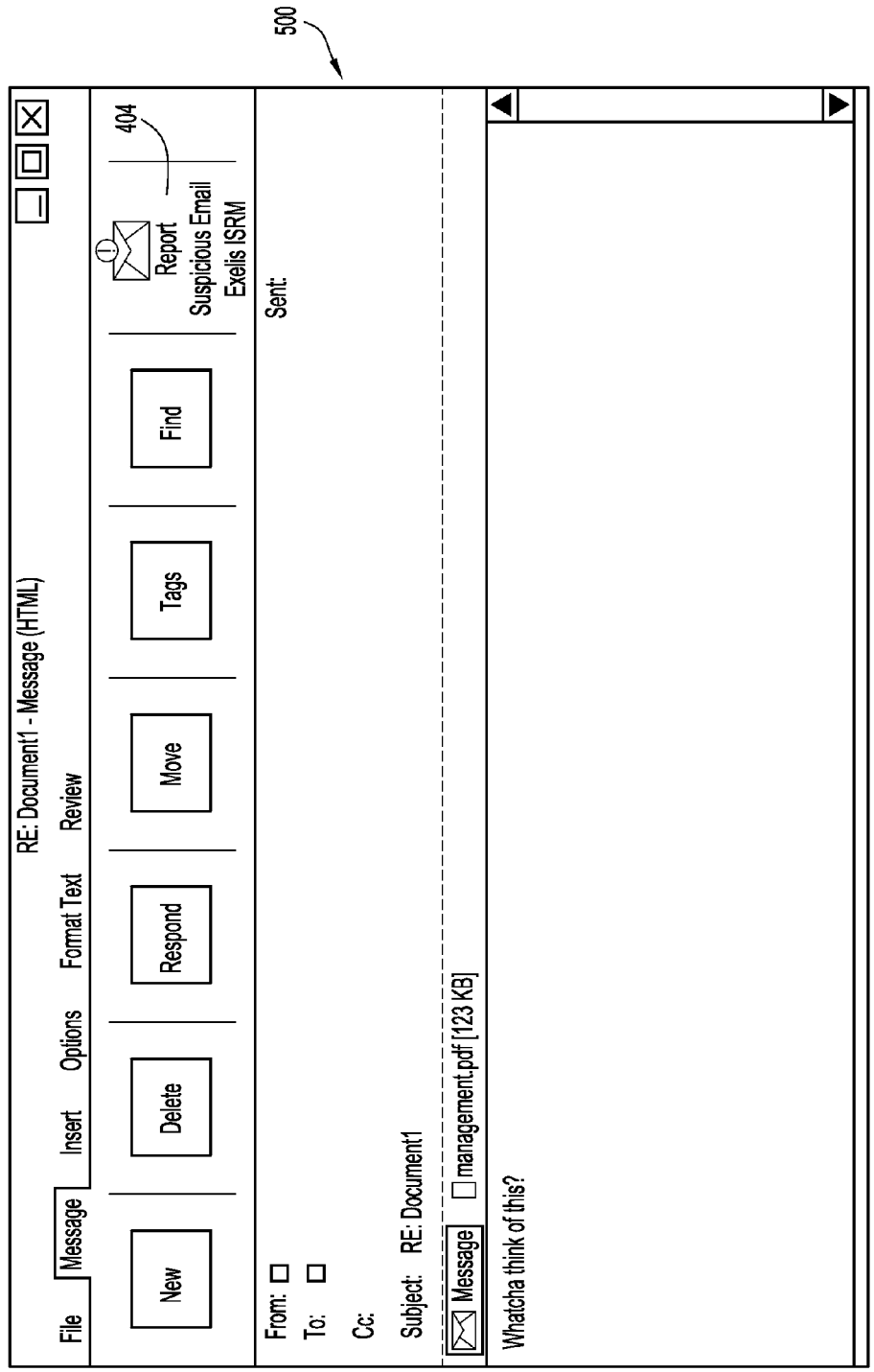

At 305, the host computer device displays via a GUI (i) one or more of the email messages received in connection with the user account, and (ii) a user selectable icon to "report suspicious email." The host computer device may display the received one or more email messages in at least two different views. In a first view, the one or more emails are presented to the user as a list, for example, as depicted in FIG. 4, described below. In a second view, a given one of the one or more email messages is presented as an open email message, i.e., the email message is opened, for example, as depicted in FIG. 5, described below.

If the user suspects that one of the displayed email messages is suspicious, the user selects both the suspicious email icon and the suspicious email message using the GUI in order to report/submit the suspicious email message.

At 310, logic 256 receives the user selections of the icon and an associated email message, i.e., the suspicious email message. In response to the selections, logic 256 automatically performs suspicious email processing in subsequent processing stages 302-304.

At 302, logic 256 collects relevant information from/about the host computer device, the user account, and the reported (suspicious) email message, including file attachments to the email message, if any.

Third processing stage 303 includes operations 320-325.

At 320, logic 256 determines an initial threat priority (i.e., severity) for the suspicious email message based on the collected information (from operation 302).

At 325, logic 256 generates threat indicators based on the collected information, including at least the file attachments to the email message.

Fourth processing stage 304 includes operations 330-340.

At 330, logic 256 determines whether any malware is associated with the suspicious email message based on the threat indicators from 325.

At 335, logic 256 creates a (human readable) event ticket/incident report for the suspicious email message having fields populated based on the collected information, the initial threat priority, the threat indicators, and the determined malware. The event ticket is a final report that contains results of the processing of the reported (suspicious) email that was performed by the second through the fourth processing stages 302-304. The event ticket represents a resolution to the action taken by the user to report the suspicious email.

At 340, logic 256 optionally displays, prints, and/or sends an email message containing at least portions of the event ticket.

Several example GUI views displayed to the user by the first processing stage 301 are now described in connection with FIGS. 4-6. The GUI views are based on Microsoft Outlook®; however, other GUI views are possible depending on the particular email client hosted on the computer device.

With reference to FIG. 4, there is depicted a view of an example email Inbox 400 that may be displayed to the user. A top banner 402 includes a prominent user selectable "Report Suspicious Email" icon 404. Email Inbox 400 also lists received email messages at 410. An email message 412 having a subject line "try this" is highlighted at the end of list 410. In order to report an email message as a suspicious email message (e.g., email message 414 having a subject line "RE: Document1"), the user selects (e.g., clicks on) that email message and then selects the "Report Suspicious Email" icon 404. The user selections are accepted and suspicious email processing of the selected email message ensues in accordance with method 400.

With reference to FIG. 5, there is depicted a view 500 of opened email message 414 "RE: Document1" that is displayed when the user selects that email message from the list of email messages 400 in Inbox 400. View 500 of opened email message 414 also includes the "Report Suspicious Email" icon 404 in an upper right-hand corner of the view 500. Thus, opened email message 414 may be reported as suspicious from view 500 as well as from the view in FIG. 4.

Figure 6:
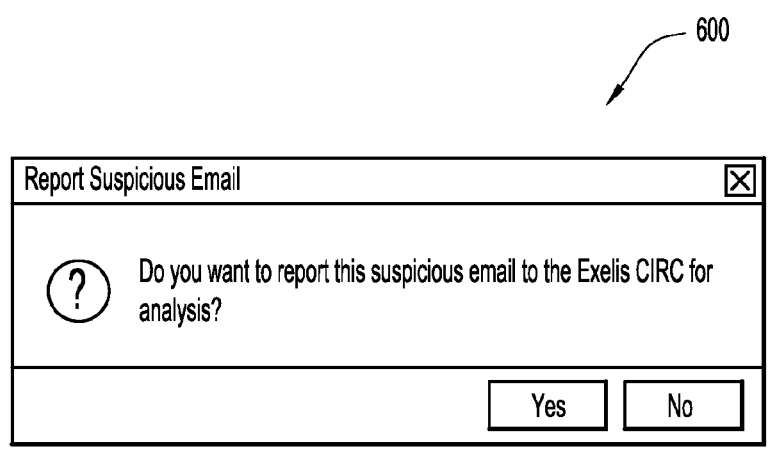

With reference to FIG. 6, there is depicted a view of a confirmation prompt 600 displayed to the user after the user selects the "Report Suspicious Email" icon 404. The user confirms the selection by clicking on the "Yes" button or abandons the selection by clicking on the "No" button depicted in FIG. 6. Logic 256 receives and responds to the Yes or No selections accordingly. If the user selects "Yes" instead of "No," logic 256 may display a view (not shown) that confirms the suspicious email message has been reported.

Figure 7:
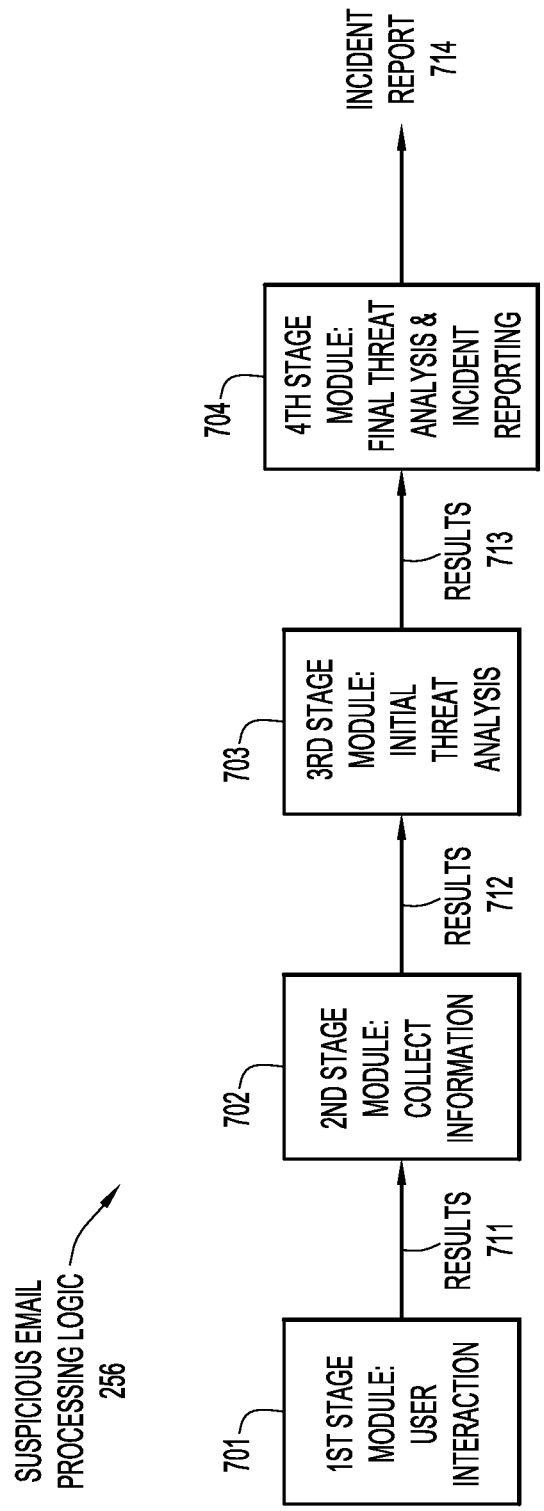
FIG. 7 is a block diagram of suspicious email processing logic divided into multiple modules according to a distributed embodiment.

As mentioned above in connection with FIG. 2, the distributed embodiment of SEP logic 256 may be employed in certain networked environments, such as the enterprise network. In the distributed embodiment, SEP logic 256 is divided into multiple logic modules as depicted in FIG. 7 that may be distributed across multiple ones of computer devices 106. FIG. 7 is a block diagram of SEP logic 256 divided into the following logic modules:

a. a first stage module 701 to perform first stage processing (301), i.e., user interaction to report a suspicious email message;
b. a second stage module 702 to perform second stage processing (302), i.e., to collect relevant information about the reported email message;
c. a third stage module 703 to perform third stage processing (303), i.e., to perform initial threat analysis for the reported email message; and
d. a fourth stage module 704 to perform fourth stage processing (304), i.e., to perform final threat analysis and incident reporting.

Modules 701, 702, and 703 each generate corresponding processing/analysis results 711, 712, and 713 and provide their processing/analysis results to the next module, as depicted in FIG. 7. Fourth stage module 704 generates results including a suspicious email incident report 714. Results 711, 712, 713, and 714 may be conveyed in email messages using email client 252.

In the example of an enterprise network, only an instance of module 701 (user interaction) and an instance of module 702 (collect information) may be hosted on each of the personal computer devices (e.g., computer devices 106a-106c) in the network, while a single instance of each of modules 703 and 704 that perform further automated processing may be hosted on a networked server (e.g., computer device 106d) that performs centralized management of email services, including suspicious email incident report handling. Communication between the distributed modules 701-704, such as sharing processing results, is simplified through the conveyance of the results using email messages supported by the email clients hosted on the computer devices.

High-level automated processing stages/operations 302-304 discussed above in connection with FIG. 3 are each now described in further detail below, beginning with high-level operation 302 to collect information.

Figure 8:
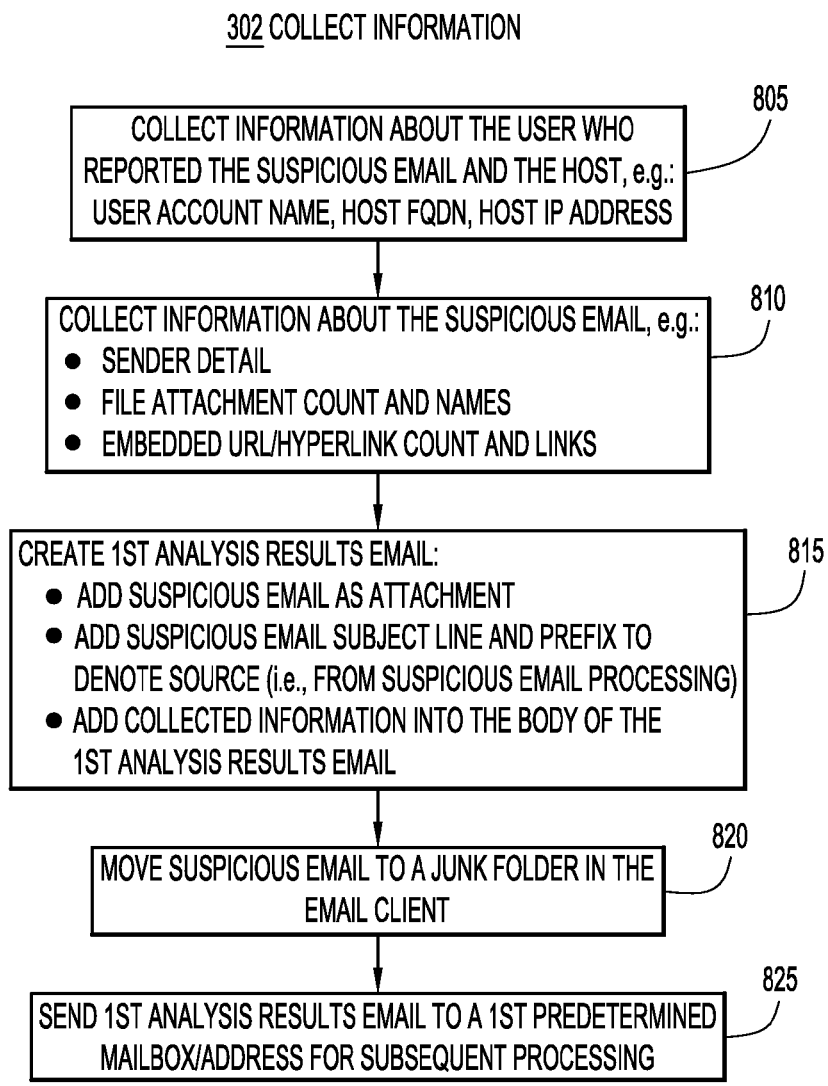
FIG. 8 is a flowchart expanding on an operation to collect information in the method depicted in the flowchart of FIG. 3.

With reference to FIG. 8, there is depicted a flowchart expanding on second processing stage/operation 302 to collect information.

At 805, logic 256 collects relevant information about the user who reported the suspicious email message and the host computer device (referred to as the "host"), including, e.g., a user account name (e.g., "John Doe"), a host Fully Qualified Domain Name (FQDN), and a host Internet Protocol (IP) address.

At 810, logic 256 collects information about the suspicious email message, including sender detail (e.g., a sender email address and a sender name), a number/count of file attachments and their names, a number/count of embedded URLs/hyperlinks and the links themselves.

At 815, logic 256 creates a first analysis results email message (e.g., results 712 in FIG. 7), to which is added:

a. the suspicious email message as an attachment;
b. the suspicious email subject line and a prefix to denote a source of the first analysis results email message (i.e., from logic 256); and
c. the information collected at 810.

At 820, logic 256 moves the suspicious email message to a junk folder in the email client.

At 825, logic 256 sends the first analysis results email message to a first predetermined email address for subsequent (next stage) processing.

Figure 9:
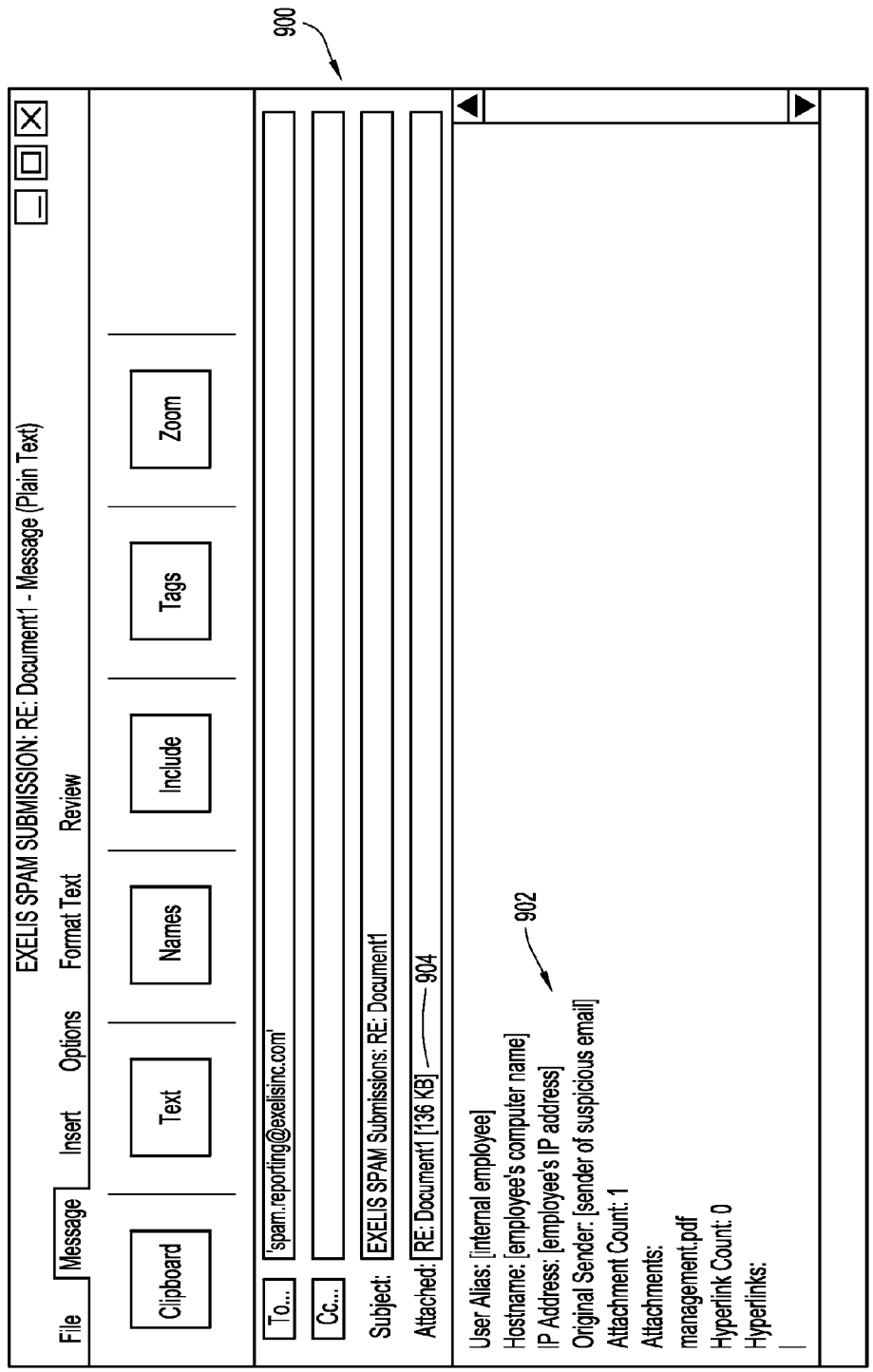
FIG. 9 is a view of an example first analysis results email created in the method depicted in the flowchart of FIG. 3.

With reference to FIG. 9, there is depicted a view of an example first analysis results email message 900 created at operation 815 after the email message 414 (from FIG. 1) having the subject line "RE: Document1" is reported. A list of the collected information is depicted at 902. The reported suspicious email message with the subject "RE: Document1" is added as an attachment at 904.

Figure 10:
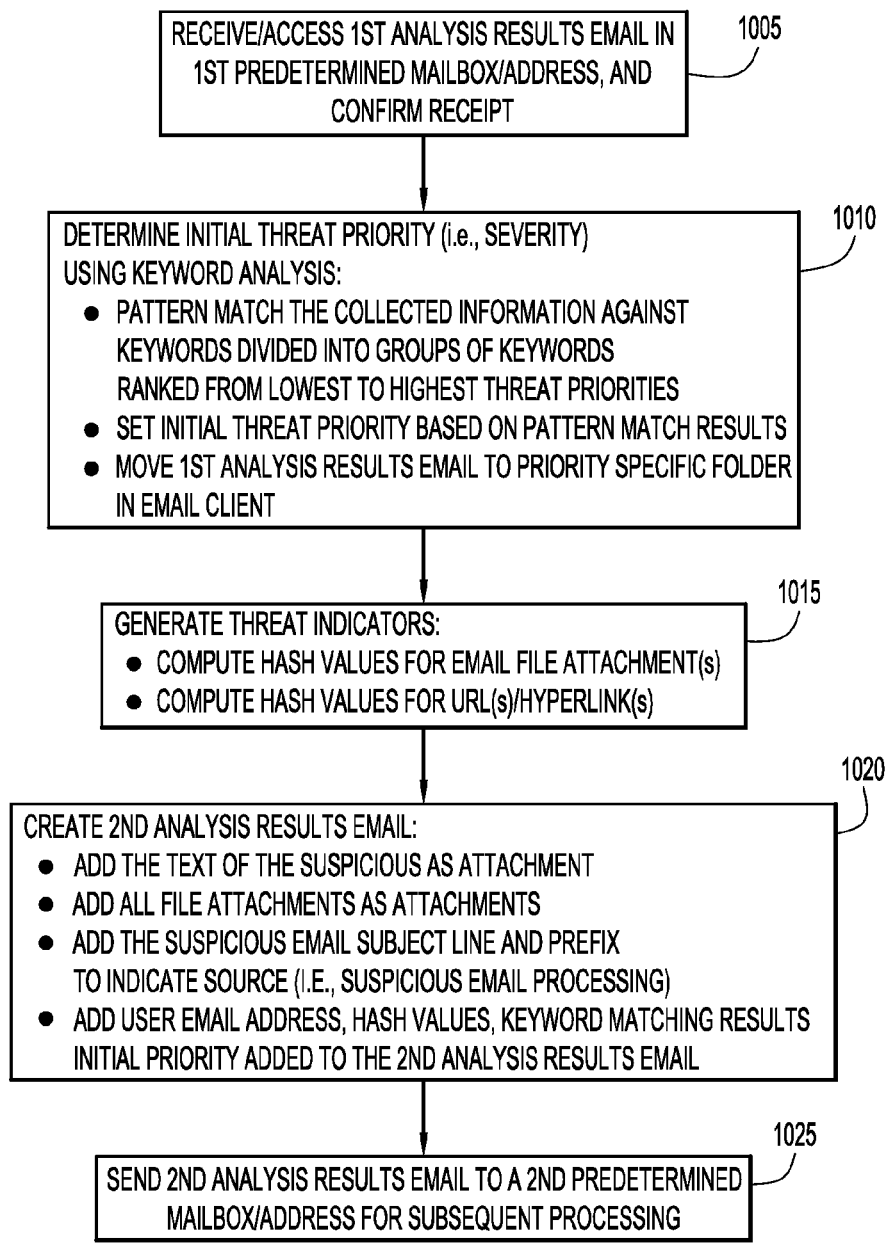
FIG. 10 is a flowchart expanding on an operation to perform initial threat analysis for a reported suspicious email message in the method depicted in the flowchart of FIG. 3.

With reference to FIG. 10, there is depicted a flowchart expanding further on third processing stage 303 (including operations 320 and 325).

At 1005, logic 256 receive/access the first analysis results email message (e.g., results 712) in the first predetermined address.

At 1010, logic 256 determines an initial threat priority (i.e., severity) using keyword analysis. To do this, logic 256 pattern matches the collected information (and the text of the suspicious email message) against keywords divided into groups of keywords ranked from lowest to highest threat priorities (e.g., from 1 to 5), and determines the initial threat priority based on pattern match results. In an embodiment, the keywords may be regular expression (Regex) keywords used to pattern match against the collected information.

Also at 1010, logic 256 moves the first analysis results email message to a priority specific folder of email client 252 based on the initial threat priority.

At 1015, logic 256 generates threat indicators for the suspicious email message. To do this, logic 256 computes hash values for any email message file attachment(s), and may also compute hash values for any embedded URL(s)/hyperlink(s). The hash values represent threat indicators and are used in subsequent processing. In an embodiment, logic 256 may compute message-digest MD5 hash values in operation 1015.

At 1020, logic 256 creates a second analysis results email message (e.g., results 713 in FIG. 7), including:
a. the text of the suspicious email message (as an attachment);
b. all file attachments of the suspicious email message (as attachments);
c. the suspicious email subject line and a prefix to identify a source (i.e., suspicious email processing);
d. the user email address, the computed hash values, the keyword match results; and
e. the initial priority.

At 1025, logic 256 sends the second analysis results email message to a second predetermined address for subsequent processing.

Figure 11:
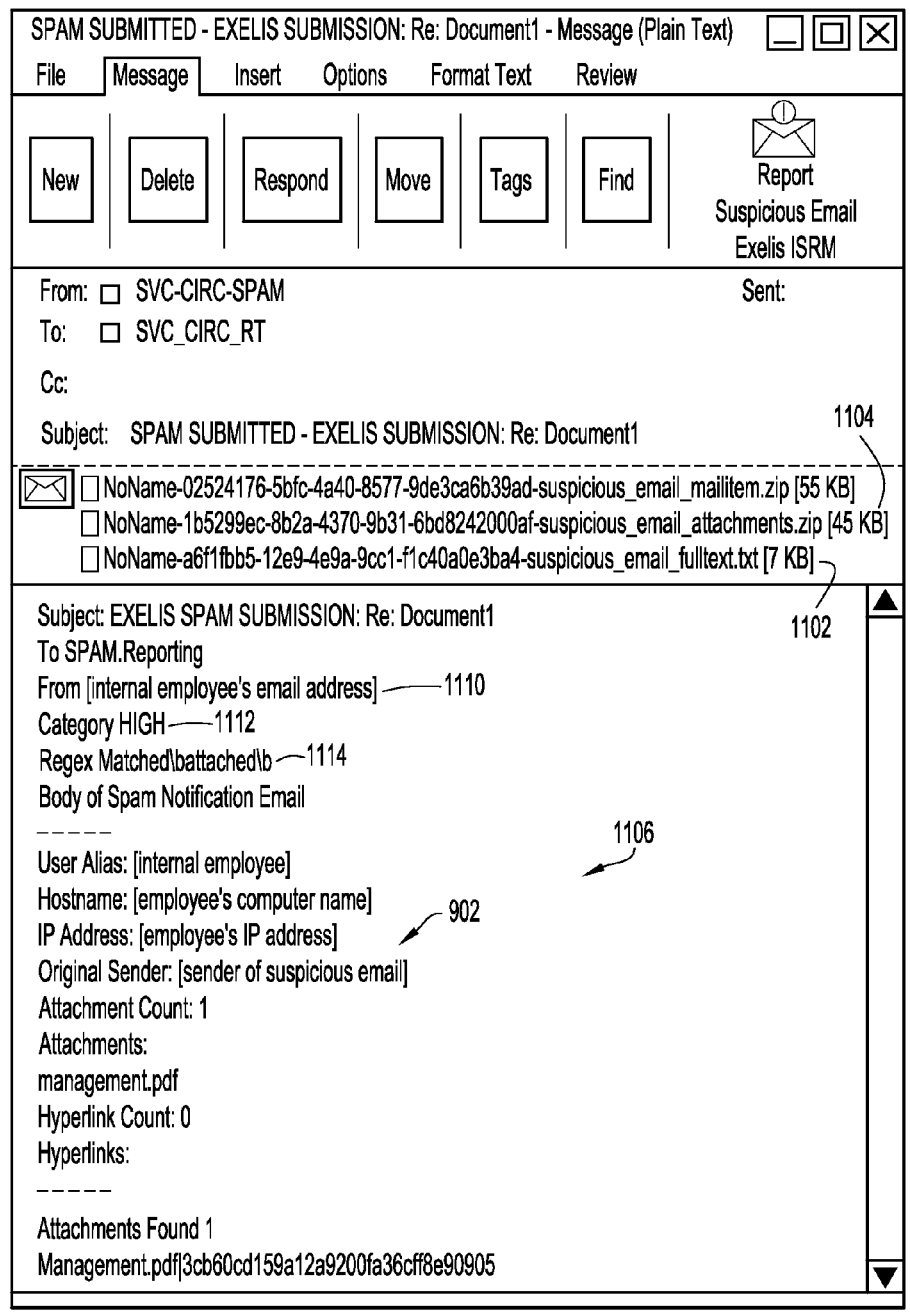
FIG. 11 there is a view of an example second analysis results email created in the method depicted in the flowchart of FIG. 3.

With reference to FIG. 11, there is depicted a view of an example second analysis results email message 1100. Results email message 1100 includes a zip file attachment 1102 that contains the text of the suspicious email message, and a zip file attachment 1104 that contains all file attachments of the suspicious email message. Results email message 1100 also includes a text body 1106 that contains a list of information collected and generated at operations 302 and 303. The relevant information includes an email address of the user account 1110, the initial threat priority 1112 (e.g., HIGH, corresponding to a 5 on a scale of 1 to 5), a file location for the Regex pattern match results 1114.

Figure 12:
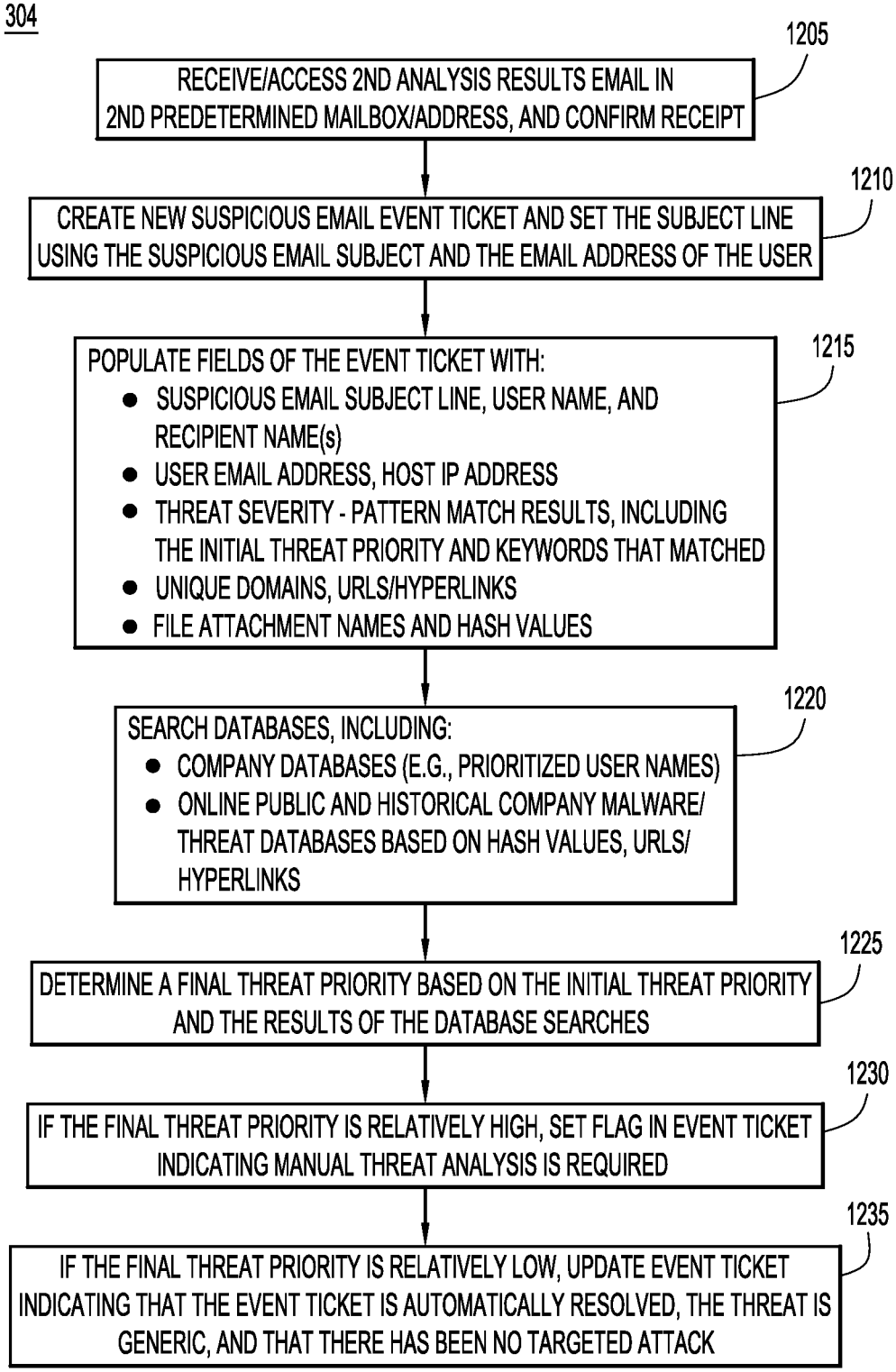
FIG. 12 is a flowchart of expanding on an operation to perform final threat analysis and incident reporting in the method depicted in the flowchart of FIG. 3.

With reference to FIG. 12, there is depicted a flowchart of operations expanding further on fourth processing stage 304 (including operations 330-340).

At 1205, logic 256 receives and accesses the second analysis results email message at the second predetermined email address.

At 1210, logic 256 creates a new suspicious email event ticket (i.e., incident report) and bases the subject line thereof on the suspicious email subject and the email address of the user.

At 1215, logic 256 populates fields of the event ticket with:
a. a suspicious email subject line, a user name, and a recipient name(s);
b. a user email address and a host IP address;
c. a threat severity, including pattern match results (e.g., keywords that matched) and the initial threat priority;
d. unique domains, URLs/hyperlinks; and
e. file attachment names and computed hash values.

At 1220, logic 256 searches various threat-related databases, including:
a. company databases (e.g., a list of prioritized user names in an enterprise database); and
b. online public or subscription-based malware/threat databases based on the hash values, and the URLs/hyperlinks; and
c. historically-populated (i.e., populated with known threats accumulated over time) and company malware/threat databases based on the hash values, and the URLs/hyperlinks.

At 1225, logic 256 determines a final threat priority based on the initial threat priority and the results of the database searches.

At 1230, if the final threat priority is determined to be relatively high, logic 256 sets a flag in the event ticket indicating that (further) manual threat analysis is required.

At 1235, if the final threat priority is determined to be relatively low, logic 256 updates the event ticket indicating that the event ticket is automatically resolved, the threat is generic, and that there has been no targeted attack.

FIG. 13 is a view of an example suspicious email event ticket 1300, which may take the form of an email message. Event ticket 1300 includes fields populated with information 1106 from previous processing stages, as well as new fields 1304 that indicate a final threat priority and resolution status. The fields 1304 reflect a relatively low priority threat determination in this example. On the other hand, a relatively high priority threat determination would have resulted in fields 1304 indicating a high final threat priority and including a statement that resolution required "manual analysis."

As described herein, techniques provided herein enable a user of an email account to report a suspicious email message simply by clicking on the email message and a prominently displayed "Report Suspicious Email." In response, the automated threat processing and incident reporting are performed for the reported (suspicious) email message. The techniques provide a standardized enterprise-wide (e.g., corporate-wide) approach for reporting and processing suspicious email messages. Advantages include: convenience and ease of use for user who wish to report suspicious email messages; visual reminders to the user to be on the look-out for and report suspicious email messages; standardization of information collection, formatting, and submission to an incident management IT team associated with the suspicious email message; reduced analysis-time and reduced complexity of review for IT personnel; and consistent and accurate tracking and resolution of reported (suspicious) email messages across all users.

In summary, in one form, a method is provided, comprising: displaying, for an email client configured to execute on a host computer device, one or more email messages received in connection with a user account and a user selectable icon to report suspicious email; and receiving user selections of the icon and an associated suspicious email message among the received one or more email messages, and responsive to the selection, automatically: collecting information from the host, the user account, and the email message; determining an initial threat priority for the email message based on the collected information; generating threat indicators based at least on each file attachment of the email message, if any; determining malware, if any, in the email message based on the threat indicators and the collected information; and creating an event ticket for the suspicious email message having fields populated based on the collected information, the initial threat priority, and the determined malware.

In another form, an apparatus is provided, comprising: a network interface unit configured to send and receive communications including email messages over a network; and a processor coupled to the network interface unit, and configured to: display, for an email client configured to execute on a host computer device, one or more email messages received in connection with a user account and a user selectable icon to report suspicious email; and receive user selections of the icon and an associated suspicious email message among the received one or more email messages, and responsive to the selection, automatically: collect information from the host, the user account, and the email message; determine an initial threat priority for the email message based on the collected information; generate threat indicators based at least on each file attachment of the email message, if any; determine malware, if any, in the email message based on the threat indicators; and create an event ticket for the suspicious email message having fields populated based on the collected information, the initial threat priority, the threat indicators, and the determined malware.

In still another form, a processor readable medium is provided for storing instructions that, when executed by a processor, cause the processor to: display, for an email client configured to execute on a host computer device, email messages received in connection with a user account and a user selectable icon to report suspicious email; and receive user selections of the icon and an associated suspicious email message among the received email messages, and responsive to the selection, automatically: collect information from the host, the user account, and the email message; determine an initial threat priority for the email message based on the collected information; generate threat indicators based at least on each file attachment of the email message, if any; determine malware, if any, in the email message based on the threat indicators; and create an event ticket for the suspicious email message having fields populated based on the collected information, the initial threat priority, the threat indicators, and the determined malware.

In yet form, a system is provided, comprising: a first computer device configured to: display, for an email client configured to execute on a host computer device, one or more email messages received in connection with a user account and a user selectable icon for suspicious email; receive user selections of the icon and an associated suspicious email message among the received email messages, and responsive to the selection, automatically: collect information from the host, the user account, and the email message; create a first analysis results email message including the collected information, the email message, and files attached to the email, if any; and send the first analysis results email message to a first predetermined email address.

The system further comprises: further comprising one or more second computer devices configured to: access the first analysis results email message from the first predetermined email address; determine a threat priority based on the accessed first analysis results email message; generate the threat indicators based on the accessed first analysis results email message; create a second analysis results email message including contents of the first analysis results email message, the determined threat priority, and the generated threat indicators; and send the second analysis results email message to a second predetermined email address.

Although the apparatus, system, method, and computer program product are illustrated and described herein as embodied in one or more specific examples, it is nevertheless not intended to be limited to the details shown, since various modifications and structural changes may be made therein without departing from the scope of the apparatus, system, method, and computer program product and within the scope and range of equivalents of the claims. Accordingly, it is appropriate that the appended claims be construed broadly and in a manner consistent with the scope of the apparatus, system, method, and computer program product as set forth in the following claims.

What is claimed is:

1. A method comprising:
    at an email client configured to execute on a host computer device, receiving one or more email messages in connection with a user account associated with an email address;
    displaying the received one or more email messages and a user selectable icon to report suspicious email; and
    receiving user selections of the icon and an associated suspicious email message among the received one or more email messages, and responsive to the selections, automatically performing suspicious email threat processing on the selected suspicious email message, the automatically performing including:
    collecting information from the host computer device, the user account, and the email message, the information including a user account name, an Internet Protocol (IP) address of the host, a number of file attachments of the email and a name of each file attachment, and hyperlinks and Uniform Resource Locators (URLs) embedded in the email message;
    determining an initial threat priority for the email message based on the collected information;
    generating threat indicators based at least on each file attachment of the email message, if any;
    determining malware, if any, in the email message based on the threat indicators and the collected information; and
    creating an event ticket for the suspicious email message having fields populated based on the collected information, the initial threat priority, and the determined malware.

2. The method of claim 1, wherein the determining the initial threat priority includes:
    pattern matching the information collected from the host computer device, the user account, and the email message against keywords divided among multiple groups of keywords ranked from a lowest to a highest threat priority; and
    setting the initial threat priority equal to one of the ranked threat priorities based on results of the pattern matching.

3. The method of claim 2, wherein:
    the generating threat indicators includes computing a hash value for each file attachment of the email message; and
    the determining malware includes searching one or more databases of malware based on the hash values.

4. The method of claim 1, further comprising:
    searching a list of user names including high priority and low priority user names based on a name associated with the user account; and
    determining a final threat priority for the email message based on the initial threat priority, the determined malware, and results of the searching a list of user names, wherein the creating an event ticket includes populating a threat severity field of the event ticket to indicate the final threat priority.

5. The method of claim 4, wherein the creating further includes:
   if the determined suspicious email threat severity is relatively high, populating a resolution status field of the event ticket to indicate that manual analysis of the email message is required to resolve the event ticket; and
   if the determined suspicious email threat severity is not relatively high, populating the resolution status field to indicate that the event ticket has been resolved automatically.

6. The method of claim 5, wherein the creating includes populating further fields of the event ticket to indicate:
   a subject line of the email message, an email sender name, a user account name, and an email address associated with the user account;
   results of the pattern matching, including keywords that matched the email message and the threat priority;
   Uniform Resource Locators (URLs) embedded in the email message; and
   names of file attachments of the email and hash values computed for the corresponding file attachments.

7. The method of claim 1, wherein the collecting further includes collecting a fully qualified domain name (FQDN) from the host.

8. The method of claim 1, further comprising:
   creating a first analysis results email message including the collected information, the email message, and files attached to the email, if any;
   sending the first analysis results email message to a first predetermined email address; accessing the first analysis results email message from the first predetermined email address; and
   performing the determining a threat priority and the generating the threat indicators based on the accessed first analysis results email message.

9. The method of claim 8, further comprising:
   creating a second analysis results email message including contents of the first analysis results email message, the determined threat priority, and the determined threat indicators;
   sending the second analysis results email message to a second predetermined email address;
   accessing the second analysis results email message from the second predetermined email address; and
   performing the determining malware and the creating an event ticket based on the accessed second analysis results email message.

10. An apparatus comprising:
    a network interface unit configured to send and receive communications including email messages over a network; and
    a processor coupled to the network interface unit and the display, and configured to: receive at an email client one or more email messages in connection with a user account associated with an email address;
    display the received one or more email messages and a user selectable icon to report suspicious email; and
    receive user selections of the icon and an associated suspicious email message among the received one or more email messages, and responsive to the selections, automatically perform suspicious email threat processing on the selected suspicious email message, wherein the processor is further configured to:
    collect information from the apparatus, the user account, and the email message, the information including a user account name, an Internet Protocol (IP) address of the host, a number of file attachments of the email and a name of each file attachment, and hyperlinks and Uniform Resource Locators (URLs) embedded in the email message;
    determine an initial threat priority for the email message based on the collected information;
    generate threat indicators based at least on each file attachment of the email message, if any;
    determine malware, if any, in the email message based on the threat indicators; and
    create an event ticket for the suspicious email message having fields populated based on the collected information, the initial threat priority, the threat indicators, and the determined malware.

11. The apparatus of claim 10, wherein the processor configured to determine the initial threat priority is further configured to:
    pattern match the information collected from the apparatus, the user account, and the email message against keywords divided among multiple groups of keywords ranked from a lowest to a highest threat priority; and
    set the initial threat priority equal to one of the ranked threat priorities based on results of the pattern matching.

12. The apparatus of claim 11, wherein:
    the processor configured to generate the threat indicators is further configured to compute a hash value for each file attachment of the email message; and
    the processor configured to determine the malware is further configured to search one or more databases of malware based on the hash values.

13. The apparatus of claim 10, wherein the processor is further configured to: search a list of user names including high priority and low priority user names based on a name associated with the user account; and
    determine a final threat priority for the email message based on the initial threat priority, the determined malware, and results of the searching a list of user names,
    wherein the processor configured to create the event ticket is further configured to populate a threat severity field of the event ticket to indicate the final threat priority.

14. The apparatus of claim 13, wherein the processor is configured to create the event ticket by:
    if the determined suspicious email threat severity is relatively high, populating a resolution status field of the event ticket to indicate that manual analysis of the email message is required to resolve the event ticket; and
    if the determined suspicious email threat severity is not relatively high, populating the resolution status field to indicate that the event ticket has been resolved automatically.

15. The apparatus of claim 10, wherein the processor is further configured to:
    create a first analysis results email message including the collected information, the email message, and files attached to the email, if any;
    send the first analysis results email message to a first predetermined email address; and
    access the first analysis email results message from the first predetermined email address,
    wherein the processor is configured to determine the initial threat priority and generate the threat indicators based on the accessed first analysis results email.

16. The apparatus of claim 15, wherein the processor is further configured to:

create a second analysis results email message including contents of the first analysis email, the determined threat priority, and the determined threat indicators; and send the second analysis results email message to a second predetermined email address;

access the second analysis results email message from the second predetermined email address, wherein the processor is configured to determine malware and create an event ticket based on the accessed second analysis results email.

17. A non-transitory processor readable medium storing instructions that, when executed by a processor, cause the processor to:

at an email client configured to execute on a host computer device, receive one or more email messages in connection with a user account associated with an email address;

display the received one or more email messages and a user selectable icon to report suspicious email; and receive user selections of the icon and an associated suspicious email message among the received email messages, and responsive to the selections, automatically perform suspicious email threat processing on the selected suspicious email message, the instructions to cause the processor to automatically perform including instructions to cause the processor to:

collect information from the host computer device, the user account, and the email message, the information including a user account name, an Internet Protocol (IP) address of the host, a number of file attachments of the email and a name of each file attachment, and hyperlinks and Uniform Resource Locators (URLs) embedded in the email message;

determine an initial threat priority for the email message based on the collected information;

generate threat indicators based at least on each file attachment of the email message, if any;

determine malware, if any, in the email message based on the threat indicators; and create an event ticket for the suspicious email message having fields populated based on the collected information, the initial threat priority, the threat indicators, and the determined malware.

18. The processor readable medium of claim 17, wherein the instructions include instructions to cause the processor to:

pattern match the information collected from the host computer device, the user account, and the email message against keywords divided among multiple groups of keywords ranked from a lowest to a highest threat priority; and set the initial threat priority equal to one of the ranked threat priorities based on results of the pattern matching.

19. The processor readable medium of claim 18, wherein the instructions include instructions to cause the processor to:

compute a hash value for each file attachment of the email message; and search one or more databases of malware based on the hash values.

20. The processor readable medium of claim 17, including further instructions to cause the processor to:

search a list of user names including high priority and low priority user names based on a name associated with the user account; and determine a final threat priority for the email message based on the initial threat priority, the determined malware, and results of the searching a list of user names, wherein the instructions to cause the processor to create an event ticket include instructions to cause the processor to populate a threat severity field of the event ticket to indicate the final threat priority.

21. The processor readable medium of claim 20, wherein the instruction to cause the processor to create an event ticket further include instructions to cause the processor to:

if the determined suspicious email threat severity is relatively high, populate a resolution status field of the event ticket to indicate that manual analysis of the email message is required to resolve the event ticket; and if the determined suspicious email threat severity is not relatively high, populate the resolution status field to indicate that the event ticket has been resolved automatically.

22. The processor readable medium of claim 17, including further instructions to cause the processor to:

create a first analysis results email message including the collected information, the email message, and files attached to the email, if any;

send the first analysis results email message to a first predetermined email address;

access the first analysis email results message from the first predetermined email address; and generate the threat indicators based on the accessed first analysis results email.

23. The processor readable medium of claim 22, including further instructions to cause the processor to:

create a second analysis results email message including contents of the first analysis email, the determined threat priority, and the determined threat indicators;

send the second analysis results email message to a second predetermined email address;

access the second analysis results email message from the second predetermined email address; and determine the malware and create the event ticket based on the accessed second analysis results email.

24. A system comprising:

a first computer device configured to:

at an email client configured to execute on the first computer device, receive one or more email messages in connection with a user account associated with an email address;

display the received one or more email messages and a user selectable icon to report suspicious email; and receive user selections of the icon and an associated suspicious email message among the received one or more email messages, and responsive to the selections, automatically perform suspicious email threat processing on the selected suspicious email message:

collect information from the first computer device, the user account, and the email message, the information including a user account name, an Internet Protocol (IP) address of the host, a number of file attachments of the email and a name of each file attachment, and hyperlinks and Uniform Resource Locators (URLs) embedded in the email message;

create a first analysis results email message including the collected information, the email message, and files attached to the email, if any; and send the first analysis results email message to a first predetermined email address.

25. The system of claim 24, further comprising one or more second computer devices configured to:

access the first analysis results email message from the first predetermined email address;

determine a threat priority based on the accessed first analysis results email message;

generate the threat indicators based on the accessed first analysis results email message;

create a second analysis results email message including contents of the first analysis results email message, the determined threat priority, and the generated threat indicators; and send the second analysis results email message to a second predetermined email address.

26. The system of claim 25, wherein the one or more second computer devices are further configured to:

access the second analysis results email message from the second predetermined email address;

determine malware, if any, in the email message based on the threat indicators in the second analysis results email;

determine a final threat priority for the email message based at least on the initial threat priority and the determined malware; and create a human readable event ticket including the final threat priority and contents of the second analysis results email message.

\* \* \* \* \*